United States Patent [19]
Steiner et al.

[11] Patent Number: 5,338,495
[45] Date of Patent: Aug. 16, 1994

[54] PORTABLE MISTING FAN

[75] Inventors: Gregory A. Steiner, Lisle; Terry Arnieri, Addison, both of Ill.

[73] Assignee: Innovative Design Enterprises, Addison, Ill.

[21] Appl. No.: 136,914

[22] Filed: Oct. 18, 1993

[51] Int. Cl.⁵ ............................................. B01F 3/04
[52] U.S. Cl. ...................................... 261/28; 261/90; 239/214.25; 239/215; 239/222.11
[58] Field of Search ............... 261/28, 90; 239/214.25, 239/215, 222.11

[56] References Cited

U.S. PATENT DOCUMENTS

| | | | |
|---|---|---|---|
| 2,079,117 | 5/1937 | Hays | 261/90 |
| 3,004,403 | 10/1961 | Laporte | 239/214.25 |
| 3,997,115 | 12/1976 | Licudine | 239/222.11 |
| 4,235,377 | 11/1980 | Davis et al. | 239/215 |
| 4,392,614 | 7/1983 | Groth et al. | 239/215 |
| 4,839,106 | 6/1989 | Steiner | 239/289 |

Primary Examiner—Tim Miles
Attorney, Agent, or Firm—Basil E. Demeur; Alan B. Samlan

[57] ABSTRACT

There is disclosed an integral portable fan and atomizing head unit forming a portable cooling unit adapted for direct attachment to a fluid reservoir such as a bottle, formed by a unit having an upper chamber and a lower chamber and a connector secured to the lower chamber. The upper chamber is provided with a motor and electrical means to activate and deactivate the motor and fan means including flexible fan blades mounted externally on the upper chamber and connected to the motor to turn in response to the activation of the motor. The lower chamber is provided with pump means and pump activation means and provided with an atomizing head in order to atomize fluid pumped up through the head. The connector is attached to the lower chamber and is adapted to disengageably engage a fluid reservoir directly, such as a bottle.

7 Claims, 1 Drawing Sheet

PORTABLE MISTING FAN

BACKGROUND OF THE INVENTION

The present invention is directed to the art field relating to portable fans. Typically, such devices take the format of a flashlight assembly having a fan head mounted at the top end as opposed to a light, and wherein the casing contains a pair of batteries to electrically operate the fan. The typical use for such device is to evacuate odors, smoke, or other deleterious substances from the immediate environment of the user thereof. It is appreciated, however, that such portable fans are used for a variety of purposes.

The present invention recognizes as an additional use for such portable fans the provision of cooling capability for the operator where the operator counters hot or very warm conditions. Typical applications would be sun-bathers, or perhaps other persons finding themselves in a work environment which is warm or hot, and sporting activities A typical portable cooling misting fan is described and claimed in U.S. Pat. No. 4,839,106, which is owned by the inventor herein. Pursuant to the description contained in the aforementioned patent, there is provided a portable misting fan which is in a self-contained unit, and is elongate in configuration such as to accommodate the provision therein of a fluid reservoir, and an extended neck portion having at the top end, a fan along with an atomizing head. As described therein, fluid is pumped from the fluid reservoir upwardly to the atomizing head which is located below the fan and as fluid is extracted from the atomizing head, the fan, which is located behind a baffle, blows the fluid onto the body of the operator. The present invention is an improvement thereover, in that various features have been changed in order to make the portable cooling fan and misting unit more efficient and therefore, more cooling in the effects realized therefrom.

Hence, the present invention relates to a portable misting fan which may be formed as an integral unit, and further includes a connector which permits the unit to be attached directly to a fluid reservoir, such as a typical bottle having a screw-threaded neck. In this format, the portable misting fan of the present invention has far greater portability and use since the entire cooling unit including the fan and atomizing head, and related accessories in order to cause the atomizer and fan to operate may be connected to any typical screw-threaded necked bottle and be useful for the purpose intended.

OBJECTS AND ADVANTAGES

It is therefore the principal object of the present invention to provide an improved portable misting fan which is formed as an integral unit consisting of an upper chamber to accommodate the fan assembly, including the motor and electrical means to operate the same, and a lower chamber which accommodates an atomizing head and activation means for activating the atomizing head, and a connector attached to the lower end portion of the lower chamber, to accommodate interconnection with a fluid reservoir such as a bottle or the like having a screw-threaded neck.

In conjunction with the foregoing object, it is a further object of the present invention to provide a portable misting fan of the type described wherein the fan unit is provided with flexible fan blades in order to minimize air resistance, and to minimize an injury to the user thereof, and also permits the use of a lighter weight and more efficient motor since the fan blade assembly is extremely light weight and easily rotatable.

In conjunction with the foregoing object, a further object of the present invention is to provide a portable misting fan of the type described wherein the atomizing head is located immediately below, but in horizontal alignment with the path of travel of the fan blades, such that upon atomization of the fluid from the fluid reservoir, the fluid is ejected into the path of travel of the fan blades thereby to further atomize the fluid in order to effect a greater cooling experience for the user.

A further object of the present invention is to provide a portable misting fan of the type described wherein the head unit is further provided with a connector consisting in the typical case of a screw-threaded cap, which permits the disengageable engagement of the entire head unit to a fluid reservoir such as a typical bottle having a threaded neck.

A further feature of the invention pertains to the particular arrangement of the parts whereby the above outline and additional operating features thereof are attained.

The invention both as to its organization and method of operation, together with further objects and advantages thereof will best be understood by reference to the following specification taken in conjunction with the accompanying drawings.

SUMMARY OF THE INVENTION

In summary, the present invention provides a totally portable misting fan unit, which is accommodated as an entire unit including a connector suitable for attachment to a fluid reservoir, typically such as a bottle or other container having a threaded neck. As such, the portable misting fan unit may be attached to any fluid reservoir, and forms a very compact and efficient portable cooling unit for use by the operator thereof.

Furthermore, the present invention provides a portable misting fan unit wherein the fan assembly includes fan blades formed of a thin flexible foam material thereby to minimize the weight associated therewith, and also to prevent injury to the operator in the event that the fan blade should touch the operator when in use. Furthermore, the present invention contemplates that the atomizing head is located immediately below and in horizontal alignment with the path of movement of the fan blades, such that when fluid is ejected from the atomizing head, it comes into direct contact with the moving fan blades, such that the fluid is further atomized in order to break up the fluid particles to create a very fine mist in the area immediately forward of the fan blade. The net effect of the misting capability of the present invention is that when directed to the user's skin, the cooling effect achieved by the fan and is further enhanced since the fluid is further atomized and the effect upon the skin of the user is to enhance the cooling capability using the fan and the atomized fluid.

Furthermore, the present invention has greater portability and usability since the unit is created as a unit with a connector, and is designed to attach to any typical bottle having a threaded neck, whether the bottle be formed of glass or plastic. As such, the fluid reservoir is not integrally formed with the unit, and hence, the operator may connect the portable misting fan unit to any reservoir having a threaded neck of the proper thread size.

DETAILED DESCRIPTION OF THE DRAWINGS

Figure 1:
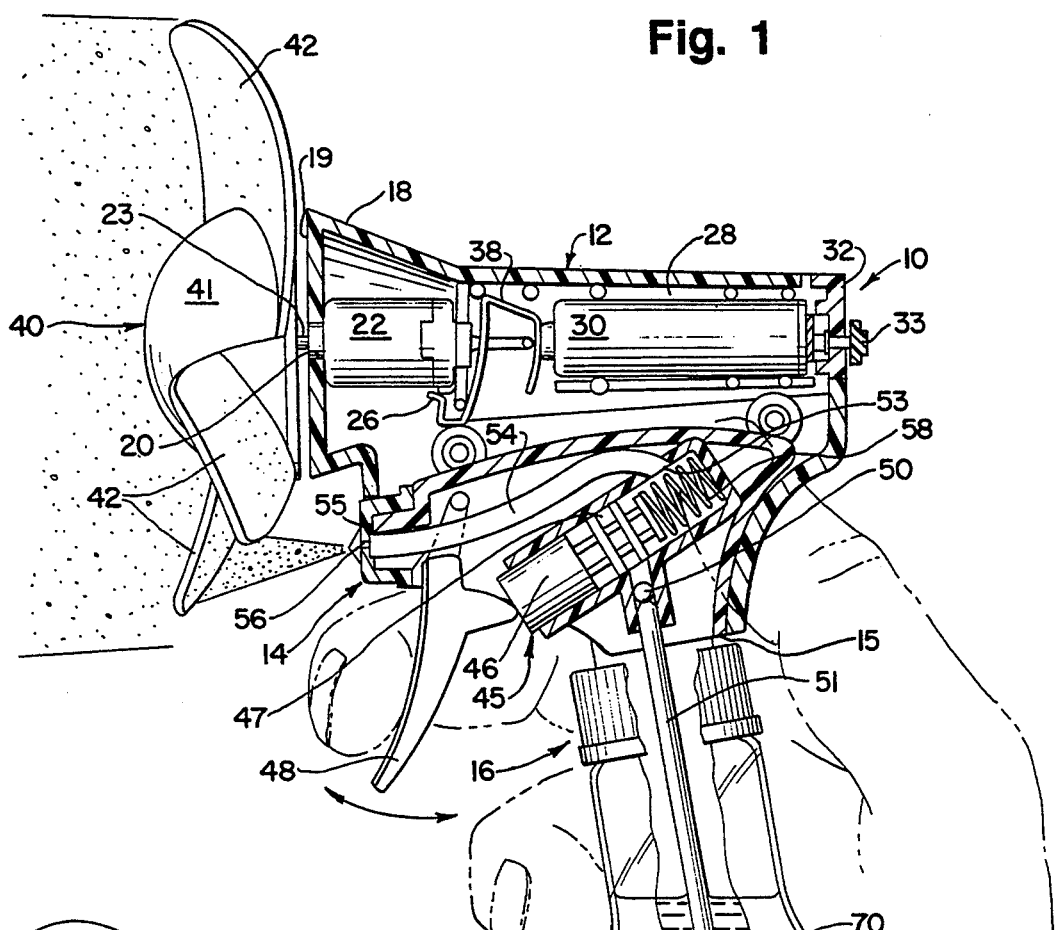
FIG. 1 is a side elevational view, in cross-section, showing the entire head unit, the connector and a fluid reservoir to which the head unit is attached.

With specific reference to FIG. 1 of the drawings, it will be observed that the present invention is formed by a head unit generally denoted by the numeral 10. The head unit 10 is comprised of an upper chamber 12 and a lower chamber 14. The lower chamber 14 has a lower end 15 which carries a connector 16 thereon. The mounting of the connector 16 to the lower end 15 of the lower chamber 14 is accommodated in a manner well-known in the art. The lower end 15 includes a flange extending downwardly therefrom, and the connector 16 has a central aperture therein, with the flange extending below the aperture, and having a sealing washer positioned below the connector aperture such that once the connector is screw-threadedly attached to a bottle, the connector aperture is sealed. Hence, it will be appreciated that the connector 16 is freely rotatable in its free-hanging position when not engaged to a screw-threaded bottle. As indicated, this arrangement is quite common and typical, and well-known in connection with sprayer bottles typically used by the consumer, especially the type which contain household cleaning solvents, waxes and the like.

Further, it will be appreciated that the connector 16 takes the form of a threaded cap, again much similar to the caps provided with plastic containers with household cleaners contained therein, and wherein the cap carries a trigger-squeezer assembly for extracting the cleaning solvent from the bottle and permitting the operator to apply it directly to a surface.

Figure 2:
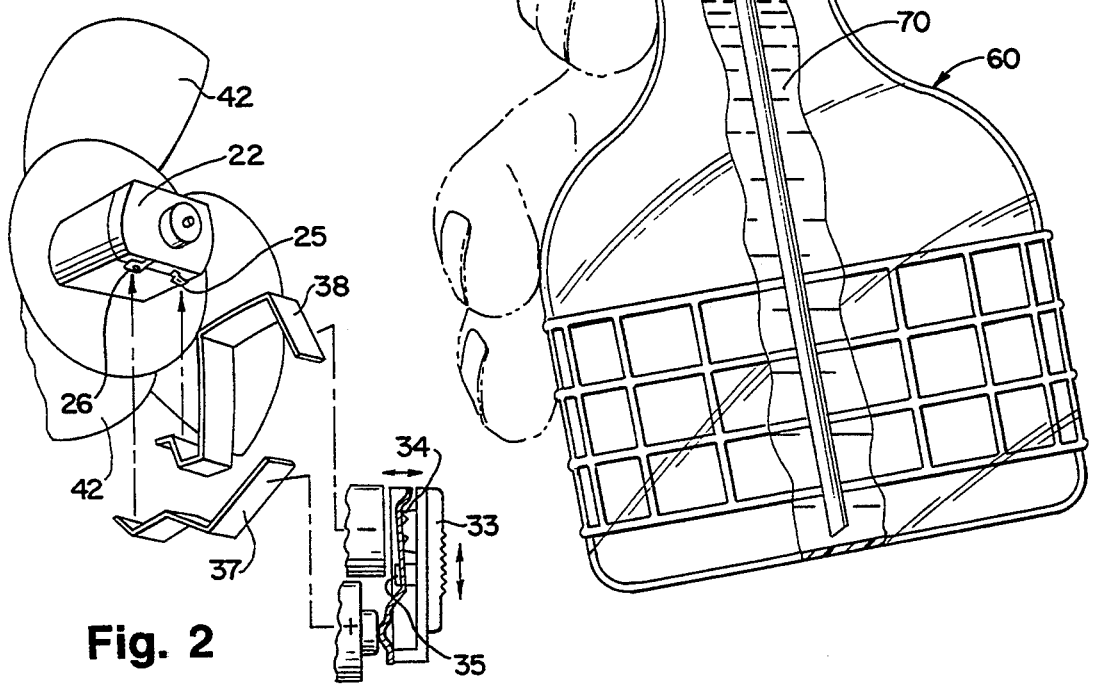
FIG. 2 is a perspective view, partly blown apart, and partly in cross-section, showing the manner in which the electrical means activates the fan motor in order to operate the fan assembly.

As more specifically shown in FIG. 1, the upper chamber 12 includes a forward chamber 18 which is provided with a front wall 19 and has a central aperture 20 formed therein. The forward chamber 18 carries a motor 22 which has an output shaft 23 at the forward end thereof, and a pair of electrical contact points 25 and 26 respectively at the rear end thereof (see FIG. 2).

The upper chamber 12 also is provided with a rear chamber 28 which carries therein the electrical power means in the form of batteries 30. The back end of the rear chamber 28 is open, thereby to accommodate the insertion and removal of the batteries 30 from the rear chamber 28, and is enclosed by means of a switch door 32 which slideably engages at the back end of the rear chamber 28 to enclose the same. The switch door 32 is provided with a slide switch 33 (see FIG. 2) which is interconnected with a pair of contacts 34 and 35 respectively which, in operation, will engage contact plates 37 and 38 respectively. It is contemplated that the operation of the slide switch 33 in conjunction with the contacts 34 and 35, and the contact plates 37 and 38 is well-known in the art, since such slide switches are used in many applications. The mechanics and operation of the switch assembly as described herein is well-known in the art and is not considered to be critical to the invention herein. Suffice it to say that in operation, when the slide switch 33 is moved to the on position, contact is established between the positive and negative terminals of the batteries 30 in order to energize the motor 22 and cause the rotational movement of the output shaft 23.

It will also be observed that at the forward end of the forward chamber 18 is a fan hub assembly 40 consisting of a fan hub 41 which, at its rear side, attaches to the output shaft 23. The fan hub 41 is provided with a plurality of fan blades 42 which are secured thereto such that once the output shaft 23 is energized to rotate, the fan hub 41 and associated fan blades 42 will similarly rotate.

In connection with the present invention, the fan blades 42 are formed of a very light weight, flexible foam material which are very unobtrusive with respect to a human. In other words, if the fan blades 42 are in their rotational mode and rotating at high speed, any touching engagement with a human will be non-obtrusive and non-harmful since the fans blades 42 flexible and formed of a foam material.

The lower chamber 14 is shown to accommodate a piston type pump 45 which consists of a piston 46 carried within the confines of a piston chamber 47. The piston 46 is activated by means of a trigger 48 which is pivotally mounted to the lower chamber 14 in such a manner as to be easily manipulable by the operator, and as illustrated in FIG. 1. The piston chamber 47 has a fluid inlet port 49 which accommodates a fluid tube 51 which frictionally fits therein, and extends downwardly and beyond the lower confines of the connector cap 16. Further, the piston chamber 47 contains a fluid outlet port 53 to which is connected an outlet tube 54 and terminates in an atomizing head 55. The atomizing head 55 has an outlet port 56 through which the fluid is ejected in a manner well-known in the art. It will also be observed that the inlet port 49 is provided with a ball valve assembly 50 which operates in a manner well-known in the art. It will be appreciated that when the trigger 48 is activated to push the piston 46 inwardly, a vacuum is created to remove the ball from the ball seat in the manner known, thereby allowing fluid up the fluid tube 51 and into the chamber 47 which will then exit through the outlet tube 54 and pass through the atomizing head 55. Once again, the structure of the pump assembly as a whole is well-known in the art and is not considered to be the inventive subject matter of the present invention other than in combination with the head unit 10 as a whole.

It is contemplated that the pump, pump activation means including trigger, and means of drawing the fluid from the fluid reservoir into the pump chamber and out the outlet port 56 and the atomizing head 55 is also well-known in the art for the reason that many such assemblies exist for household use. The typical example of such assemblies is a household cleaner contained within a plastic bottle and provided with a trigger pump at the top end through which the operator may manipulate the pump trigger in order to cause fluid to be ejected from the fluid reservoir out of the outlet port, again in a manner well-known in the art.

With respect to the present invention, it will be observed that the atomizing head 55 and the outlet port 56 formed therein is located immediately below and in a horizontal alignment with the path of travel of the fan blades 42. As illustrated in FIG. 1, when the operator manipulates the trigger 48 to cause fluid from the fluid reservoir 60 to be drawn into the piston chamber 47 and out through the atomizing head 55, the fluid will be ejected immediately rearwardly of the fan blades, and when the fan blades 42 are in their operating rotational mode, the fluid will strike the rear of the fan blade and be further atomized. The effect of the atomization is that when the operator directs the fan and the atomizing mist on their body, the cooling effect is further enhanced.

It will be observed that the piston 46 and piston chamber 47 is spring loaded by means of the coil spring 58 in a manner typically known in the art such that the operator is permitted to effect several cycles of the pump in order to keep a steady stream of the fluid 70 from the fluid reservoir 60 coming up through the fluid tube 51 and exiting through the fluid port 56.

It will be observed also that the fluid reservoir 60 is in the form of a bottle which may be a typical plastic bottle of the type having a screw-threaded head. In this manner, the connector 16 is similarly in the form of a typical plastic cap which has internal threads formed therein, the entire head unit 10 may be easily disengaged from any bottle reservoir 60, and reattached to any other bottle having a threaded neck portion. Further, since the connector cad 16 is fitted onto the flange hanging from the lower chamber 14 in the manner previously indicated, the entire head unit 10 is rotatable relative to the connector 16, once the connector is screw threadedly engaged onto the fluid bottle reservoir 60.

It will be appreciated, therefore, that the entire portable misting fan of the present invention including the atomizing head and fan assembly is carried on a single head unit which is integrally formed, and further includes a connector associated therewith such that the entire unit may be disengaged from any bottle and re-engaged to any other bottle having a screw threaded neck. Further, since the atomizing head is now located immediately rearwardly of the path of travel of the fan blades 42, the fluid exiting from the fluid port 56 will exit and strike the fan blades 42 as the same rotate to effect a fine mist or further atomizing of the fluid such that the mist, when directed at the operator's body, will have a very cooling effect.

As previously indicated, the fan blades 42 are formed of a flexible foam material such that they are very light weight, and unobtrusive and non-harmful to a human even when in striking contract with the human body. A further beneficial effect of providing fan blades which are formed of a foam material is the fact that the motor 22 may be a light weight motor since it does not have to push a heavy load in rotational fashion. As such, a lower torque motor may be employed in the device, which also requires less current to operate. This will result in a longer life for the batteries 30, and in total, require lower cost in order to manufacture and maintain the operational characteristics of the device.

It will therefore be appreciated while there has been described what is at present considered to be the preferred embodiment of the invention, it will be understood that various modifications may be made therein and it is intended to cover in the appended claims all such modifications as fall within the true spirit and scope of the invention.

We claim:

1. An integral portable fan and atomizing head unit forming a portable cooling unit, adapted for direct attachment to a fluid reservoir of the type having connection means for accepting the connection thereto of the cooling unit, comprising in combination, a head unit formed by an upper chamber and a lower chamber and having a connector secured to said lower chamber, said upper chamber provided with a motor and electrical means to activate and deactivate said motor, and fan means including flexible fan blades mounted externally on said upper chamber and connected to said motor to turn in response to the activation of said motor, said lower chamber provided with pump means and pump activation means carried therein and provided with an atomizing head in fluid communication with said pump means and pump activation means, said atomizing head being positioned below said upper chamber and in direct horizontal alignment with said fan means, said connector on said lower chamber being adapted to disengageably engage the connection means of the fluid reservoir, said upper chamber, lower chamber and connector formed as an integral head unit, whereby said head unit may be disengageably engaged to a fluid reservoir which provides a source of fluid and said pump means may be activated to expel a fluid in the path of the fan means when the fan means is simultaneously activated in response to the activation of said motor thereby to provide a portable cooling unit.

2. The portable cooling unit as set forth in claim 1 above, wherein said head unit is disengageably engaged to the fluid reservoir thereby to be transferrable to an alternate fluid reservoir having connection means associated therewith.

3. The portable cooling unit as set forth in claim 1 above, wherein said electrical means comprises a pair of positive and negative contacts, said positive and negative contacts being in contact with said motor, an on/off switch, and batteries interposed between said switch and said positive and negative contacts thereby to provide electrical energy to said motor when said switch is manipulated to the on position.

4. The portable cooling unit as set forth in claim 3 above, wherein said pump means comprises a spring-loaded piston carried within said lower chamber, said lower chamber further provided with a first fluid entry port which, in use, is in fluid communication with the fluid in the fluid reservoir, and a second fluid exit port formed in said lower chamber, said fluid exit port being positioned below said upper chamber and in horizontal alignment with said fan means, whereby fluid expelled by said pump through said fluid exit port will strike said fan means thereby atomizing the expelled fluid.

5. The portable cooling unit as set forth in claim 4 above, wherein said fan means comprises a fan hub connected to said motor by a motor shaft, and a plurality of flexible fan blades mounted on said fan hub adapted to travel in a circular path.

6. The portable cooling unit as set forth in claim 5 above, wherein said fluid exit port is positioned to be in horizontal alignment with the circular path of travel of said flexible fan blades, whereby fluid expelled from said fluid exit port will strike said flexible fan blades when said motor is electrically activated to rotate said fan hub and atomize the fluid.

7. The portable cooling unit as set forth in claim 6 above, wherein said connector mounted on said lower chamber comprises a cap provided with screw threads, and the fluid reservoir comprises a bottle head having a screw-threaded neck forming the connection means thereof, whereby said head unit may be screw threadedly mounted on a bottle of the type having a screw-threaded neck thereby to form a portable cooling unit.

* * * * *